Patented Sept. 2, 1930

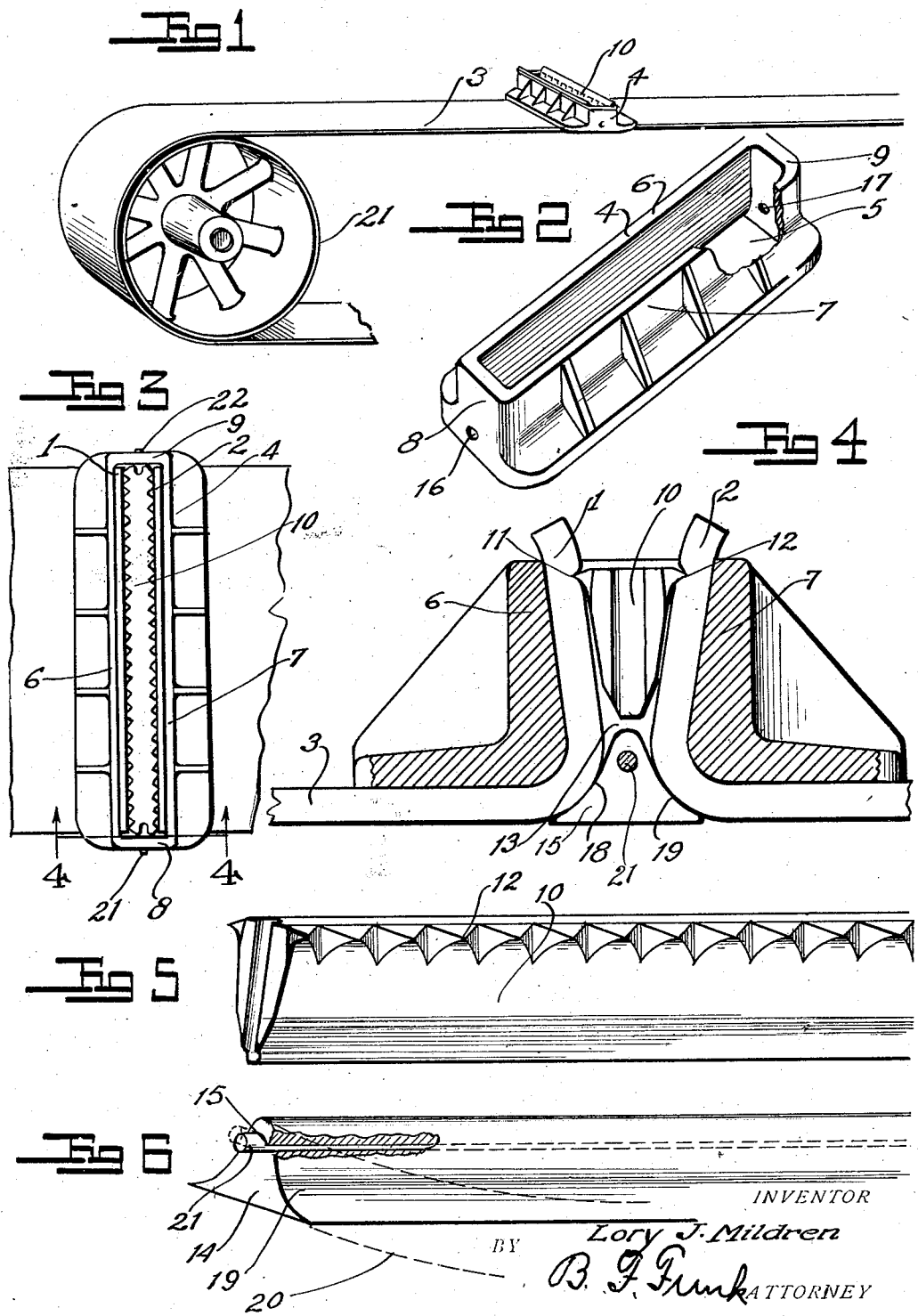

1,774,807

UNITED STATES PATENT OFFICE

LORY J. MILDREN, OF PONCA CITY, OKLAHOMA

SELF-LOCKING MUFFLER BAR FOR BELT CLAMPS

Application filed November 16, 1928. Serial No. 319,804.

This invention relates to self-locking muffler bars for belt clamps and the primary object is to provide means for preventing the belt clamp from making a noise as it passes over the pulley. The muffler bar is an improvement on a known type of belt clamp and it can be so associated therewith that noises common to this type of clamp will be practically eliminated.

To this end the invention consists in certain novel construction which will be specifically described hereinafter, reference being had to the accompanying drawings in which:

Fig. 1 is a perspective view of a pulley and part of a belt to which my invention is applied.

Fig. 2 is a perspective view of the belt clamp frame, part of one of the sides being broken away.

Fig. 3 is a top plan view of the belt clamp.

Fig. 4 is an enlarged sectional view on the line 4—4 of Figure 3.

Fig. 5 is a detail view of the clamping bar and

Fig. 6 is a view partly in perspective and partly in section of the muffler bar.

The two ends 1 and 2 of the belt 3 are secured together by a belt clamp. The belt clamp embraces a frame consisting of a substantially rectangular member 4 with an elongated slot 5 so that the frame has side bars 6 and 7 and end connecting webs 8 and 9. The ends of the belt are passed up through the slot and then a wedge-shaped clamping bar 10 is inserted into the slot to wedge the ends of the belt against the inner inclined faces of the side bars 6 and 7. The clamping bar is provided with oppositely disposed belt engaging teeth or projections 11 and 12 to bite into the belt structure as indicated in Figure 4. The pull on the end of the belt forces the wedge-shaped bar 10 into the slot so the greater the pull, the greater the wedging action and consequently, the clamping effect of the bar 10.

The structure thus far described is old and well known. With such a structure there is a slot or recess 13 at the base of the frame 4 and as the belt clamp passes over the pulley, it makes an objectionable sound. My invention has to do with a muffler or silencer for preventing this objectionable sound. It consists of a non-metallic bar 14 (see Fig. 6) which is triangular in cross-section. It is provided with a flexible locking bar 15, the respective ends of which are adapted to be inserted into the holes or openings 16 and 17 in the webs or ends 8 and 9 of the frame 4. The side surfaces 18 and 19 of the muffler bar conform to the curvatures of the bends in the belt at the bottom of the frame so that the surfaces 18 and 19 fit snugly against the bends in the belt. Since the bar 14 is made of flexible non-metallic material such as fabric, fibrous material or sound deadening composition and since the flexible locking rod is embedded in the bar, it is obvious that the bar and rod can be flexed to the position shown in dotted lines 20, Figure 6, so the length of the bar can be shortened to permit the projecting ends of the rod to snap into the openings 16 and 17 of the frame 4, thereby holding the muffler bar in locking position with respect to the frame 4 and in intimate contact with the belt. Therefore, as the belt clamp passes over the pulley 21 or over a similar pulley, an unbroken surface will be presented to the pulley, thus eliminating liability of sounds so that the belt will run over the pulley in a substantially noiseless manner.

I do not wish to be limited to any particular material for the bar since there are numerous sound deadening materials, the essential feature of my invention residing more particularly in a bar for bridging the gap between the bends of the belt. Of course, it is to be understood that when the belt clamp is to be removed, the bar can be flexed to withdraw the ends 21 and 22 of the rod from the holes or openings 16 and 17.

What I claim and desire to secure by Letters-Patent is:—

1. In combination with a belt clamp having a frame with openings in its ends of a flexible muffler bar provided with end projections for engagement with the openings in the end of the frame.

2. In combination with a belt clamp having a frame with end openings and a belt clamping bar in the frame, of a belt engaging muffler bar having belt engaging sides and a locking rod carried by the bar, the ends of which engage the openings in the frame.

3. A flexible muffler bar for belt clamps having end projections to engage openings in the belt clamping frame.

4. A flexible muffler bar for belt clamps and a flexible rod embedded in the bar, the ends of which project beyond the ends of the bar.

5. A flexible muffler bar for belt clamps, triangular in cross-section and belt clamp engaging projections on the bar.

6. A muffler bar for belt clamps consisting of sound deadening material and a belt clamp engaging rod embedded in the bar, the ends of which project beyond the ends of the bar.

7. In combination, a belt clamp having a rectangular frame with end openings, a belt clamping bar in the frame and a flexible muffler bar beneath the clamping bar having end projections to engage the end openings in the belt clamping frame.

8. In combination, a belt clamp having a rectangular frame with end openings, a belt clamping bar in the frame, a flexible muffler bar consisting of sound deadening material and a rod embedded in the bar, the ends of which project beyond the sound deadening material to engage the openings in the frame.

In testimony whereof I affix my signature.

LORY J. MILDREN.